Nov. 7, 1933.  H. J. CRINER  1,934,622
BREAD SLICING MACHINE
Filed Dec. 18, 1931  3 Sheets-Sheet 1

Harry J. Criner INVENTOR.

BY Curtis V Bush

ATTORNEY.

Nov. 7, 1933.  H. J. CRINER  1,934,622
BREAD SLICING MACHINE
Filed Dec. 18, 1931   3 Sheets-Sheet 2

Harry J. Criner
INVENTOR.

BY Curtis V Bush
ATTORNEY.

Nov. 7, 1933.  H. J. CRINER  1,934,622
BREAD SLICING MACHINE
Filed Dec. 18, 1931   3 Sheets-Sheet 3

Harry J. Criner
INVENTOR.

BY Curtis V Bush
ATTORNEY.

Patented Nov. 7, 1933

1,934,622

UNITED STATES PATENT OFFICE 1,934,622

BREAD SLICING MACHINE

Harry J. Criner, Davenport, Iowa, assignor, by mesne assignments, to The Micro Corporation, Bettendorf, Iowa, a corporation of Delaware Application December 18, 1931
Serial No. 581,782

10 Claims. (Cl. 146—98)

My invention relates to improvements in bread slicing machines.

The objects of my invention are:

1. In a rotary bread slicing machine having opposed series of cutters and having carriers mounted upon cross-bars which pass between the opposed cutters, to provide means by which the opposed cutters may be separated intermittently and the cross-bars pass between them so as to permit the use of thicker, stronger cross-bars than would be possible with rigidly mounted cutters.

2. In a rotary bread slicing machine having opposed series of cutters, to provide means for adjusting the relative position of the opposed series of cutters.

3. In a rotary bread slicing machine of the isthmus type, to provide readily adjustable means for changing the relative position of the opposed cutters so as to vary the thickness of the isthmus.

4. In a rotary bread slicing machine, to provide improved means for carrying the bread to the cutters.

I accomplish these objects by the means shown in the accompanying drawings, in which,—

Similar numerals refer to similar parts throughout the several views.

My apparatus has a substantially rectangular frame made up of a pair of side frames, 1, with feet, 2. The side frames are secured in spaced relation by cross tie-rods, 3, or other suitable cross-bracing, which may be in any desired form.

In the upper portion of each side frame on the inner side thereof, I provide a carrier groove, 14, which extends the entire length of the side frame. Below the groove are united to each side frame a plurality of fixed bearing boxes the upper half of which, 4, is formed integral with the side frame and the lower half of which, 20a, is united to the upper half by set screws, 4a.

Above the groove on each of the side frames, 1, I form integral with the side frames, housings, 6, which are substantially rectangular in form, and slidingly mounted within the housings, I secure bearing boxes, 20.

Figure 2:
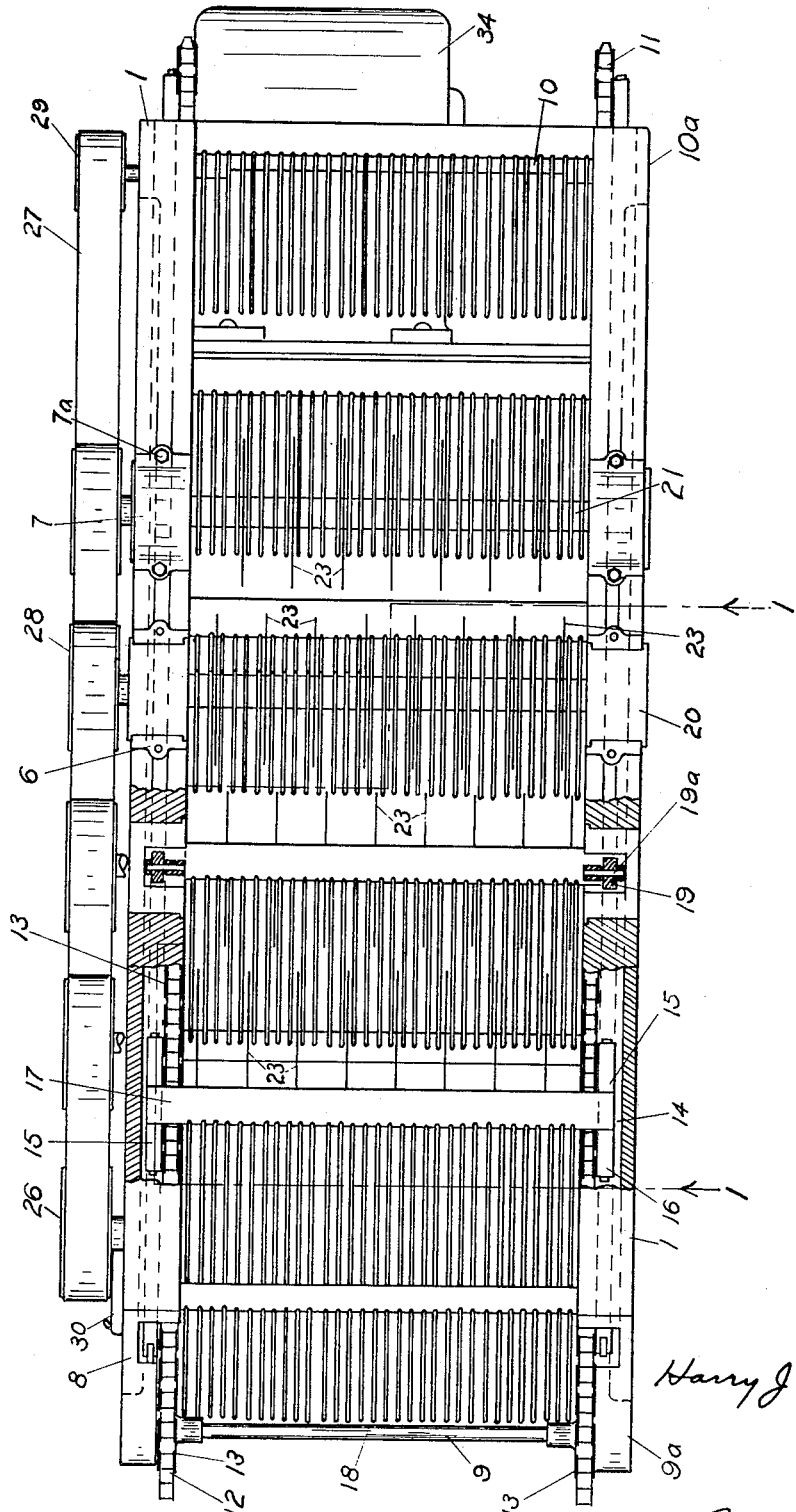
Figure 2 is a plan view partly in section, on the line 2—2 of Figure 1.

Arbors or cutter shafts, 21, are mounted in the bearing boxes, 20, and are preferably provided with ball bearings, 22. These arbors or shafts extend transversely of the machine and one end of each projects outwardly beyond one of the side frames as shown in Figure 2.

Figure 3:
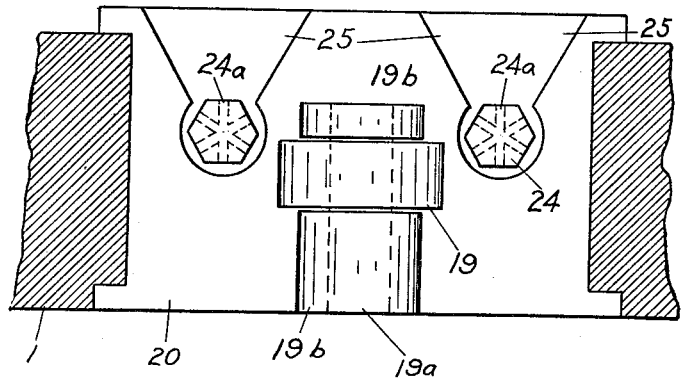
Figure 3 is an enlarged detail showing a bottom view of one of the movable bearing boxes.
Figure 4:
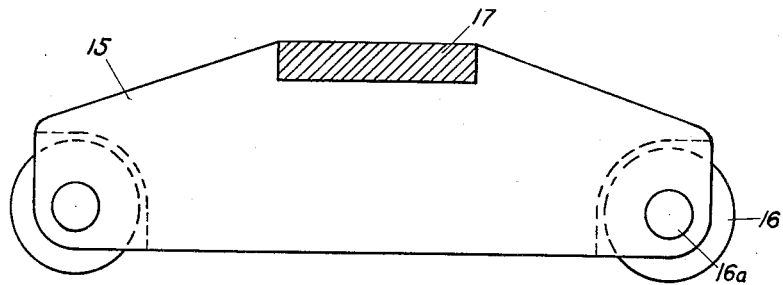
Figure 4 is an enlarged detail elevation of one of the carrier cams.
Figure 5:
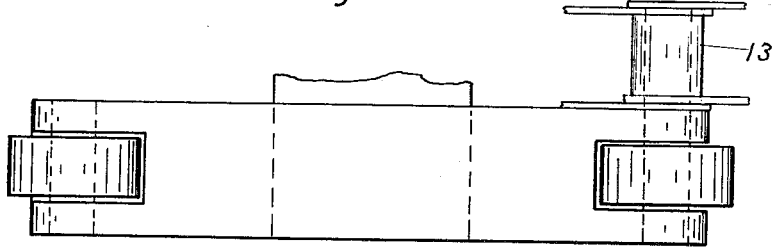
Figure 5 is an enlarged detail bottom view of one of the carrier cams.

These bearing boxes, 20, are secured within the housings by overlapping flanges as shown in Figure 3 and by caps, 7, united to the housings by bolts, 7a.

The lower faces of the bearing boxes, 20, may rest upon the upper face of the adjacent side frame, 1, but in order to provide means for adjusting same, I form each bearing box, 20, with an opening, 25, in the lower face thereof and in the opening, 25, I secure a set screw, 24. In order to permit adjustment of the bearing box without removing same from the frame, I form the outer portion of the opening, 25, in fan-shape and bore a plurality of holes, 24a, in the head of the set screw, 24, so that a small rod may be inserted in one of the holes, 24a, and the set screw, 24, turned thereby. The set screws, 24, when turned below the lower face of the bearing boxes, 20, form legs which rest upon the upper face of the frame, 1, and thus regulate the distance to which the bearing boxes, 20, may descend. A pair of bosses, 19b, is formed upon the lower end of each of the bearing boxes, 20, and a pivot pin, 19a, is secured in each boss. A cam follower, 19, is revolvably mounted upon the pivot, 19a, and may be provided with a ball bearing.

In each pair of fixed bearing boxes below the grooves I mount an arbor or cutter shaft, 21a, which may be mounted in ball bearings, 21b, if desired.

Sprocket shafts, 9 and 10, are mounted in bearings 9a and 10a, in the ends of the side frames, with sprocket wheels, 12 and 11, mounted thereon near the opposite ends of the shafts.

Sprocket chains, 13, are mounted upon the sprocket wheels, 12 and 11. Each sprocket chain has a plurality of cams or carriages, 15, linked therein mounted upon wheels, 16, secured upon the cams by pivots, 16a. The wheels, 16, are arranged to run upon the lower face of the groove, 14. The cams, 15, upon one of the chains, 13, are mounted directly opposite the corresponding cams in the opposite chain, 13, and the cams of each pair are united by the cross-bar, 17, one end of the cross-bar being rigidly secured to one cam and the other end of the cross-bar being rigidly secured to the opposite cam.

These cross-bars may be of any desired form which will give the greatest strength and stiffness relatively to the sectional area thereof.

I have shown cross-bars comprising flat bars of rectangular section. Each of the cross-bars has united thereto a plurality of carriers, 18. The carriers, 18, are preferably united to the cross-bars by notching the cross-bars, inserting the carriers, 18, in the notches, and securely brazing them in place, but any other means of fastening may be used which will maintain sufficient rigidity. The carriers are preferably formed substantially L-shaped with the vertical arm of the L doubled to form a rectangle.

Figure 1:
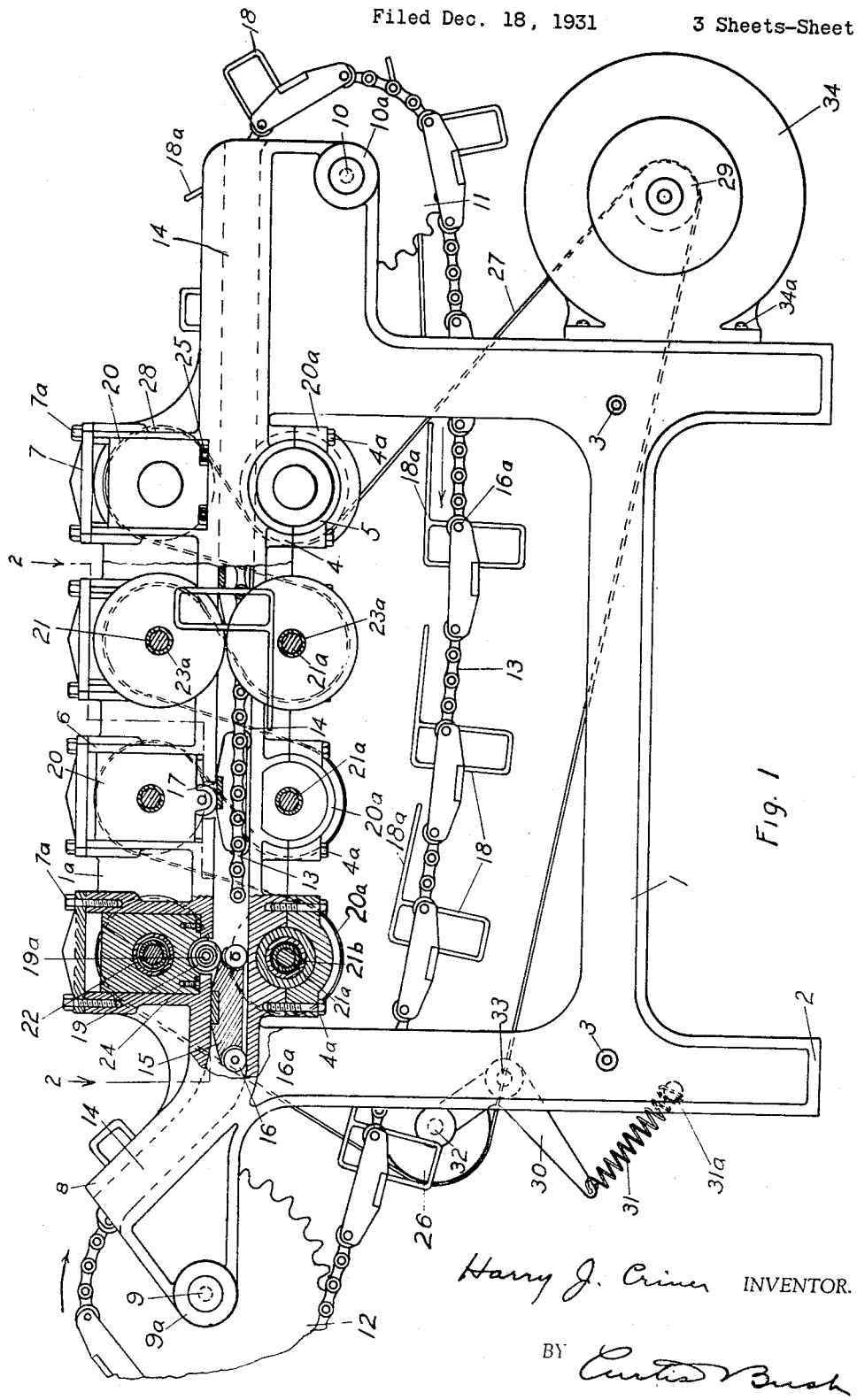
Figure 1 is a side elevation of my machine, partly in section, on the line 1—1 of Figure 2.

The horizontal arms, 18a, of the carriers, 18, form a support for the bread when moving to the cutters. In Figure 1, the upper half of the carrier chain, 13, moves from left to right. The carriers, 18, are formed of wires or rods small enough to pass between the adjacent cutters of any given series without touching the cutters.

Some difficulty has been experienced in feeding appliances for rotary machines in keeping the cross-bars, 17, from bending or coming in contact with the cutters. In slicing isthmus bread, it is preferred to leave the isthmuses one-eight of an inch in thickness and that would necessitate spacing the opposed cutters one-eight of an inch apart. When so spaced, the cross-bars of a feeding appliance would be limited to one-eighth of an inch in thickness and if made as thick as that, would be likely to come in contact with and dull the cutting edges of some of the blades. In order to permit the use of thicker cross-bars which will not bend and come in contact with the blades, I have made each of the upper cutter assemblies movable vertically by slidingly mounting the bearing boxes carrying same within their housings.

The housings for the upper bearing boxes are preferably united by intermediate ribs, 1a, formed integral with the side frames. The cutting blades or cutters, 23, are arranged upon the arbors, 21, and 21a and spaced apart by spacers, 23a.

Where several series of cutters are used, it is advisable to stagger them as shown in Figure 2.

A motor, 34, is secured to one end of the frame by bolts, 34a, having a drive pulley, 29, which drives a belt, 27, which passes over the arbor pulleys, 28, and also over an idler pulley, 26, mounted upon an idler shaft, 32, which in turn is mounted in a bell-crank lever, 30, which is pivoted to the frame by a pivot, 33, and actuated by a spring, 31, one end of which is attached to the bell-crank lever and the other end of which is secured to the frame by a bolt, 31a.

While I have shown the cutter shafts in vertical alignment, it is obvious that the upper shaft may be slightly in advance of or to the rear of the lower cutter shaft without departing from the spirit of my invention.

In the operation of my device, the bread is fed either manually or by suitable mechanical means to the carriers at the upturned portion, 8, of the frame. It is then carried by the carriers toward the cutters. The cutters are mounted so as to revolve in the same direction as the chain, 13, travels, whereby the friction of the cutters upon the bread will hold the bread in contact with the rectangular portions of the carrier, 18, which will act as a detent for the bread.

The cams and cross-bars and bread carriers are so arranged that the cams will successively raise the upper bearing boxes, thereby causing the cutters upon each of the upper arbors to clear the cross-bars, 17, until the cross-bars are past the middle of the cutters, when the slope of the cams will permit the bearing boxes to be lowered until they rest upon the adjusting screws 24, in which position the cutters will cut the bread, leaving an isthmus of the desired thickness.

In practice it has been found that a very thin isthmus will afford practically no resistance to the separation of the slices. This gives the same effect for all practical purposes as if the slits made by the cutters extended entirely through the loaf without leaving any isthmus whatever.

My form of apparatus, therefore, will permit the upper arbors to be so adjusted relatively to the lower ones that the cutting edges of the opposed blades will barely clear and when so arranged, the bread will, for all practical purposes, be sliced entirely through. At the same time, the cam arrangement shown will permit the cutting blades to be separated far enough so that the cross-bars can pass between them without danger of striking or dulling the edges of the cutting blades.

On the other hand, if it is desired to leave isthmuses of more than the usual thickness in the sliced bread, the adjusting screw, 24, may be turned down so as to raise the upper arbors and increase the clearance between the opposed cutters to any desired extent within the limits of adjustability of the set screws, 24.

The invention shown, described and claimed herein is directed to improvements on the inventions shown in my copending applications Serial No. 423,669, filed January 27, 1930; Serial No. 424,849, filed January 31, 1930; Serial No. 462,559, filed June 20, 1930; and Serial No. 516,065, filed February 16, 1931; applications Serial Nos. 423,669, 462,559 and 516,065 being directed to opposed rotary cutters and feeding means for moving loaves of bread to, through and beyond the cutters, and application Serial No. 424,849 being directed to the arrangement of the cutters carried by opposed pairs of cutter shafts.

Various modifications of the shape and proportion of the various parts may be made without departing from the spirit of my invention and I do not limit my claims to the precise forms illustrated in the drawings.

I claim:

1. In a bread slicing machine, a frame comprising a pair of spaced side frames suitably united, a plurality of pairs of fixed shaft bearings united to the side frames and a plurality of fixed cutter shafts rotatably mounted therein, a plurality of pairs of fixed housings united to the frames above the fixed bearings, movable bearing boxes slidably mounted in the housings, a plurality of movable cutter shafts rotatably mounted in the bearing boxes parallel to the fixed cutter shafts, bosses formed upon the lower ends of the movable bearing boxes, a cam follower wheel pivotally mounted in each of said bosses, longitudinal grooves formed in the inner faces of the side frames, pairs of sprocket wheels revolvably mounted at the front and rear ends of the frame, sprocket chains mounted upon the sprocket wheels, cross-bars mounted upon the chains, the ends of the crossbars having united thereto cams which cams are united to the sprocket chains and adapted to travel in the longitudinal grooves respectively and to contact with the cam follower wheels thereby raising the movable bearing boxes and upper cutter shafts mounted therein as they pass, and means to drive the cutter shafts and the sprocket wheels simultaneously.

2. In a bread slicing machine, a pair of spaced rotary shafts, one of said shafts being fixed and the other being bodily movable, a series of spaced cutters secured to each of said shafts, each cutter of one series being in the same plane as a cutter of the other series, an endless conveying means including interconnected cross bars, said cross bars being movable between the series of cutters, means for guiding the ends of said cross bars, and means engageable with said cross bars for moving said bodily movable shaft away from the fixed shaft during the movement of said cross bars between said series of cutters.

3. In a bread slicing machine, a pair of spaced rotary shafts, one of said shafts being fixed and the other being bodily movable, a series of cutters on one of said shafts, a series of cutters on the other of said shafts, each cutter of one series being in the plane of a corresponding cutter of the other series, a conveying cross bar movable between said series of cutters, guides for the ends of said cross bar, cam elements at the ends of said cross bar, and means at the ends of said bodily movable shaft engageable with said cam elements during movement of said cross bar between said series of cutters whereby to move said bodily movable shaft relative to said fixed shaft.

4. In a bread slicing machine, a framework, a fixed cutter shaft rotatably mounted in said framework, spaced bearing means carried by said framework and being movable relative to said cutter shaft, a second cutter shaft journaled in said bearing means, an endless conveyor including interconnected cross bars movable between said cutter shafts, guides on said framework for guiding the ends of said cross bars, and means at the ends of said cross bars for engaging said bearing means during movement of said cross bars between said shafts whereby to move said second cutter shaft relative to said first shaft.

5. In a bread slicing machine, a framework, a fixed cutter shaft rotatably mounted in said framework, a plurality of spaced cutters carried by said shaft, a second shaft, a plurality of spaced cutters carried by said second shaft, each being in the same plane as a cutter on the first shaft, bearing blocks for journaling the ends of said second shaft, said bearing blocks being movably mounted in said framework to permit movement of said second shaft toward and away from said first shaft, an endless conveyor having interconnected cross bars substantially parallel to said cutter shafts and positioned to move between the cutters on one shaft and the cutters on the other shaft, means on said framework for guiding the ends of said cross bars, and means at the ends of said cross bars engaging and moving said bearing blocks during the passage of said cross bars between said cutters whereby to move said second shaft away from said first shaft.

6. In a bread slicing machine, a framework, a fixed cutter shaft rotatably mounted in said framework, a plurality of spaced cutters carried by said shaft, a second shaft, a plurality of spaced cutters carried by said second shaft, each being in the same plane as a cutter on the first shaft, bearing blocks for journaling the ends of said second shaft, said bearing blocks being movably mounted in said framework to permit movement of said second shaft toward and away from said first shaft, an endless conveyor having interconnected cross bars substantially parallel to said cutter shafts and positioned to move between the cutters on one shaft and the cutters on the other shaft, means on said framework for guiding the ends of said cross bars, cam members secured to the ends of said cross bars, and means on said bearing blocks engageable with said cam members during movement of said cross bars whereby to move said second shaft away from said first shaft to permit the passage of said cross bars between the cutters of said shafts.

7. In a bread slicing machine, a framework, a fixed cutter shaft rotatably mounted in said framework, a plurality of spaced cutters carried by said shaft, a second shaft, a plurality of spaced cutters carried by said second shaft, each being in the same plane as a cutter on the first shaft, bearing blocks for journaling the ends of said second shaft, said bearing blocks being movably mounted in said framework to permit movement of said second shaft toward and away from said first shaft, an endless conveyor having interconnected cross bars substantially parallel to said cutter shafts and positioned to move between the cutters on one shaft and the cutters on the other shaft, means on said framework for guiding the ends of said cross bars, cam members secured to the ends of said cross bars, and rollers on said bearing blocks engageable with said cam members during movement of said cross bars whereby to move said second shaft away from said first shaft to permit the passage of said cross bars between the cutters of said shafts.

8. In a bread slicing machine, a framework, a fixed cutter shaft rotatably mounted in said framework, a plurality of spaced cutters carried by said shaft, a second shaft, a plurality of spaced cutters carried by said second shaft, each being in the same plane as a cutter on the first shaft, bearing blocks for journaling the ends of said second shaft, said bearing blocks being movably mounted in said framework to permit movement of said second shaft toward and away from said first shaft, an endless conveyor having interconnected cross bars substantially parallel to said cutter shafts and positioned to move between the cutters on one shaft and the cutters on the other shaft, means on said framework for guiding the ends of said cross bars, and means at the ends of said cross bars engaging and moving said bearing blocks during the passage of said cross bars between said cutters whereby to move said second shaft away from said first shaft, each of said cross bars having finger portions for supporting and conveying an unsliced loaf of bread to said cutters.

9. In a bread slicing machine, a framework, a fixed cutter shaft rotatably mounted in said framework, a plurality of spaced cutters carried by said shaft, a second shaft, a plurality of spaced cutters carried by said second shaft, each being in the same plane as a cutter on the first shaft, bearing blocks for journaling the ends of said second shaft, said bearing blocks being movably mounted in said framework to permit movement of said second shaft toward and away from said first shaft, an endless conveyor having interconnected cross bars substantially parallel to said cutter shafts and positioned to move between the cutters on one shaft and the cutters on the other shaft, means on said framework for guiding the ends of said cross bars, and means at the ends of said cross bars engaging and moving said bearing blocks during the passage of said cross bars between said cutters whereby to move said second shaft away from said first shaft, each of said cross bars having finger portions for supporting and conveying an unsliced loaf of bread to said cutters, the body of each cross bar being in advance of said finger portions whereby to pass between said cutters prior to the slicing of the bread supported by said fingers.

10. In a bread slicing machine, a series of spaced upper shafts each having cutters thereon, a series of spaced lower shafts each having cutters thereon, the cutters on each lower shaft being disposed in the same plane as the cutters on an upper shaft, the cutters on each shaft in each series being offset relative to the adjacent shaft of the same series, one series of shafts being fixed and the other being bodily movable, an endless conveying means including interconnected cross bars movable between the upper and lower series of cutters, means for guiding the ends of said cross bars, and means carried by each shaft of the bodily movable series of shafts engageable with the ends of said cross bars for bodily moving the said shaft away from a shaft of the fixed series to permit the passage of said cross bars between the cutters carried thereby.

HARRY J. CRINER.